(12) United States Patent
Diks-Warmerdam et al.

(10) Patent No.: US 12,466,560 B2
(45) Date of Patent: Nov. 11, 2025

(54) CONTAINER FOR STORING AND SERVING SCOOPABLE FROZEN CONFECTIONERY

(71) Applicant: Conopco, Inc., Englewood Cliffs, NJ (US)

(72) Inventors: Leonie Martine Diks-Warmerdam, Maassluis (NL); Johannes Krieg, Rotterdam (NL)

(73) Assignee: Conopco, Inc., Englewood Cliffs, NJ (US)

(*) Notice: Subject to any disclaimer, the term of this patent is extended or adjusted under 35 U.S.C. 154(b) by 624 days.

(21) Appl. No.: 17/781,362

(22) PCT Filed: Nov. 7, 2020

(86) PCT No.: PCT/EP2020/081401
§ 371 (c)(1),
(2) Date: May 31, 2022

(87) PCT Pub. No.: WO2021/110358
PCT Pub. Date: Jun. 10, 2021

(65) Prior Publication Data
US 2022/0411065 A1    Dec. 29, 2022

(30) Foreign Application Priority Data
Dec. 4, 2019  (EP) ..................................... 19213453

(51) Int. Cl.
*B64D 11/00*   (2006.01)
*F25D 11/00*   (2006.01)

(52) U.S. Cl.
CPC ........ *B64D 11/0007* (2013.01); *F25D 11/006* (2013.01)

(58) Field of Classification Search
CPC ... B64D 11/0007; F25D 11/006; F25D 3/125; F25D 3/06; B62B 3/02; B62B 3/004; B62B 3/005; B62B 2204/04
See application file for complete search history.

(56) References Cited

U.S. PATENT DOCUMENTS

| 2,165,327 | A | 7/1939 | Philip |
| 4,296,426 | A | 10/1981 | Gilles |

(Continued)

FOREIGN PATENT DOCUMENTS

| AU | 2014382728 | 8/2016 |
| CN | 102213529 | 10/2011 |

(Continued)

OTHER PUBLICATIONS

Search Report and Written Opinion in EP19174511; Oct. 25, 2019.
(Continued)

*Primary Examiner* — Frantz F Jules
*Assistant Examiner* — Martha Tadesse
(74) *Attorney, Agent, or Firm* — Bond, Schoeneck & King, PLLC

(57) ABSTRACT

A thermally insulated container for storing a scoopable frozen confectionery and serving a scoop thereof to a consumer, and suitable for mounting within a service cart, the container comprising: a thermally insulated housing having at least one openable portion to allow access to an enclosed insulated chamber; a product storage assembly mounted within the enclosed insulated chamber and defining an internal product storage chamber that is accessible via the openable portion of the thermally insulated housing, the outer surface of the product storage assembly being substantially parallel to but spaced away from substantially all of the inner surface of the thermally insulated housing, the average spacing being from 1 to 10 mm; at least one (Continued)

reservoir of phase change material located in the enclosed insulated chamber; at least one scoopable frozen confectionery container support positioned in the internal product storage chamber, the frozen confectionery container support being withdrawable from the internal product storage chamber via the openable portion of the thermally insulated housing; and wherein at least one frozen confectionery container is supported on the at least one frozen confectionery container support, the frozen confectionery container comprising a removable lid and containing a source of scoopable frozen confectionery; the arrangement being such that, in use, the openable portion can be opened to permit the withdrawal of the frozen confectionery container support and the frozen confectionery container from the internal product storage chamber, the lid of the frozen confectionery container being removable to expose the scoopable frozen confectionery, for enabling a scooped serving of the frozen confectionery to be removed from the source of scoopable frozen confectionery and serving to a consumer.

15 Claims, 2 Drawing Sheets

(56) References Cited

U.S. PATENT DOCUMENTS

| | | | |
|---|---|---|---|
| 4,528,439 | A | 7/1985 | Marney |
| 4,898,294 | A * | 2/1990 | Jennings ............ A47J 41/0044 |
| | | | 312/236 |
| 8,763,811 | B2 | 7/2014 | Lantz |
| 9,303,912 | B1 * | 4/2016 | Schalla ............ A47B 31/02 |
| 9,731,895 | B2 | 8/2017 | Manning |
| 10,046,901 | B1 | 8/2018 | Jobe |
| 10,168,090 | B1 | 1/2019 | Chapman, Jr. |
| 10,266,332 | B2 | 4/2019 | Aksan |
| 11,046,500 | B2 | 6/2021 | Collison |
| 11,078,008 | B2 | 8/2021 | Dankbaar |
| 11,199,354 | B2 | 12/2021 | Geitz |
| 11,828,516 | B2 | 11/2023 | Sun |
| 2003/0111472 | A1 | 6/2003 | Lerner |
| 2003/0131623 | A1 | 7/2003 | Suppes |
| 2006/0006621 | A1 | 1/2006 | Santa Cruz et al. |
| 2009/0078708 | A1 | 3/2009 | Williams |
| 2010/0170287 | A1 | 7/2010 | Boss |
| 2011/0277489 | A1 | 11/2011 | Schalla et al. |
| 2014/0021208 | A1 | 1/2014 | Anti |
| 2014/0054297 | A1 | 2/2014 | Patstone |
| 2014/0263835 | A1 | 9/2014 | Godecker et al. |
| 2014/0331946 | A1 | 11/2014 | Eilemann et al. |
| 2015/0143818 | A1 | 5/2015 | Eckhoff |
| 2015/0191192 | A1 | 7/2015 | Savage et al. |
| 2016/0320080 | A1 | 11/2016 | Hieke |
| 2017/0023290 | A1 | 1/2017 | Demuth |
| 2017/0297717 | A1 | 10/2017 | Moran et al. |
| 2018/0282049 | A1 | 10/2018 | Tumber |
| 2018/0339838 | A1 | 11/2018 | Hall |
| 2018/0346122 | A1 * | 12/2018 | Kzrak ............ B64D 11/0007 |
| 2019/0162639 | A1 | 5/2019 | Gutelius |
| 2020/0161616 | A1 | 5/2020 | Chen |
| 2020/0290790 | A1 | 9/2020 | Mowery |
| 2021/0300665 | A1 | 9/2021 | Mechor |
| 2022/0087254 | A1 | 3/2022 | Bixon |

FOREIGN PATENT DOCUMENTS

| | | | |
|---|---|---|---|
| CN | 102379532 | | 11/2011 |
| CN | 102607235 | | 7/2012 |
| CN | 103988045 | | 8/2014 |
| CN | 203958959 | | 11/2014 |
| CN | 204937738 | | 1/2016 |
| CN | 205947109 | | 2/2017 |
| CN | 206761922 | | 12/2017 |
| CN | 108602562 | | 9/2018 |
| CN | 209209482 | | 8/2019 |
| CN | 209312826 | | 8/2019 |
| DE | 29611084 | | 11/1996 |
| EP | 2700891 | | 2/2014 |
| GB | 2543837 | | 5/2017 |
| JP | 2012102744 | | 5/2012 |
| JP | 2012131539 | | 7/2012 |
| JP | 2013085550 | | 5/2013 |
| JP | 2016084149 | | 5/2016 |
| KR | 100836844 | | 6/2008 |
| KR | 101457029 | | 10/2014 |
| WO | WO03083386 | | 10/2003 |
| WO | WO-03083386 | A1 * | 10/2003 ............ A23G 9/225 |
| WO | WO08104639 | | 9/2008 |
| WO | WO2008107657 | | 9/2008 |
| WO | WO12056086 | | 5/2012 |
| WO | WO2015120911 | | 8/2015 |
| WO | WO2017072508 | | 5/2017 |
| WO | WO2019161426 | | 8/2019 |
| WO | 2020229236 | | 11/2020 |
| WO | 2020229426 | | 11/2020 |
| WO | 2021110357 | | 6/2021 |

OTHER PUBLICATIONS

Search Report and Written Opinion in EP19174506; Oct. 25, 2019.
Search Report and Written Opinion in EP19213453; May 25, 2020.
Search Report and Written Opinion in EP19213454; Jun. 4, 2020.
Search Report and Written Opinion in PCTEP2020062473; Jul. 23, 2020.
Search Report and Written Opinion in PCTEP2020063082; Jul. 23, 2020.
Search Report and Written Opinion in PCTEP2020081401; Feb. 3, 2021.
Search Report and Written Opinion in PCTEP2020081400; Feb. 3, 2021.
Co-pending U.S. Appl. No. 17/610,784; filed Nov. 12, 2021, entitled Container for Storing and Serving Frozen Confectionery Items.
Co-pending U.S. Appl. No. 17/610,790; filed Nov. 12, 2021, entitled Container for Storing and Serving Frozen Confectionery Items.
Co-pending U.S. Appl. No. 17/781,361; filed May 31, 2022, entitled Container for Storing and Serving Frozen Confectionery Items.

* cited by examiner

CONTAINER FOR STORING AND SERVING SCOOPABLE FROZEN CONFECTIONERY

FIELD OF THE INVENTION

The present invention relates to a thermally insulated container for storing and serving scoopable frozen confectionery, and particularly to such containers which are designed to be removably mountable within a service cart.

BACKGROUND OF THE INVENTION

Inflight service carts (i.e. wheeled trolleys) are commonly used for storing and dispensing food and beverages on modern commercial aircraft. Such carts facilitate at-seat service of these products during the flight. Similar service carts are used on other modes of transport (e.g. on trains). Keeping the foodstuffs at an appropriate temperature within such carts is a recognised problem.

There is prior art relating to refrigerated storage of foodstuffs within inflight service carts, which largely focuses on maintaining the temperature of the foodstuffs within the chilled range (e.g. +2° C. to +8° C.). Dry ice is typically used as the refrigerant. For example, WO 2012/056086 A1 relates to a refrigerator unit for an inflight service cart which utilises dry ice in such a way that it releases chilled air evenly, and without freezing the products.

The storage of frozen products, such as ice cream and similar frozen confections, has also been addressed by the prior art. U.S. Pat. No. 4,898,294 describes a frozen food container for aircraft usage. The container comprises bottom, end, side and top walls formed of a thermally insulating material contained between an inner and outer shell, the top wall having an insulated lid formed in the forward portion thereof. Preferably the container is provided with one or more receptacles adapted to receive dry ice, with the top wall of the container comprising these dry ice storage chambers.

Using dry ice in containers for storing and serving frozen confectionery items is not ideal. Firstly, such frozen confectionery items are too hard to be consumed directly if kept at −78° C. Secondly, since the dry ice sublimes, it will inevitably need replacing after a single use.

Therefore, there remains a need to provide insulated containers which improve the length of time that the frozen confectionery items can be kept at a suitable temperature in order to ensure that they can be consumed directly on serving. It is preferred that such insulated containers are reusable.

Furthermore, there is a need to achieve this when the frozen confectionery items are stored and served in an environment remote from a storage freezer and/or wherein the container needs to be transportable thus enabling an at-seat service of the frozen confectionery items to passengers (e.g. during a flight or a train journey).

SUMMARY OF THE INVENTION

In a first aspect, the invention relates to a thermally insulated container for storing a scoopable frozen confectionery and serving a scoop thereof to a consumer, and suitable for mounting within a service cart, the thermally insulated container being unpowered and comprising: a thermally insulated housing having an inner surface, defining an enclosed insulated chamber, and an outer surface for mounting engagement with a service cart, the thermally insulated housing having at least one openable portion to allow access to the enclosed insulated chamber through both the inner and outer surfaces; a product storage assembly, mounted within the enclosed insulated chamber, having an outer surface and an inner surface, the inner surface defining an internal product storage chamber, the internal product storage chamber being accessible via the openable portion of the thermally insulated housing, and the outer surface being substantially parallel to but spaced away from at least 90% of the surface area the inner surface of the thermally insulated housing, the average spacing being from 1 to 10 mm; at least one reservoir of phase change material located in the enclosed insulated chamber; at least one scoopable frozen confectionery container support positioned in the internal product storage chamber, the frozen confectionery container support being withdrawable from the internal product storage chamber via the openable portion of the thermally insulated housing; and wherein at least one frozen confectionery container is provided, supported on the at least one frozen confectionery container support, the frozen confectionery container comprising a removable lid, and containing a source of scoopable frozen confectionery; the arrangement being such that in use, the openable portion can be opened to permit the withdrawal of the frozen confectionery container support and the frozen confectionery container from the internal product storage chamber, the lid of the frozen confectionery container being removable to expose the scoopable frozen confectionery, for enabling a scooped serving of the frozen confectionery to be removed from the source of scoopable frozen confectionery and serving to a consumer.

The present invention relates to a thermally insulated container for storing and serving scoopable frozen confectionery. There is no particular limitation with regard to the type of scoopable frozen confectionery which can be stored and served using the insulated container. Non-limiting examples of scoopable frozen confectionery include ice cream, gelato, frozen yoghurt, sorbet, granita, and the like.

The thermally insulated container of the present invention comprises a thermally insulated housing. The interior walls prescribe an inner surface, defining an enclosed insulated chamber. The exterior walls, prescribing an outer surface, are preferably cuboid, with 6 thermally insulated sidewalls. The outer surface may be designed to engage with a service cart and will contain the necessary mechanical interlocking arrangement, such as ridges, latches and interconnections to enable such engagement according to the particular design of the service cart.

The thermally insulated housing has at least one openable portion to allow access to the enclosed insulated chamber. The enclosed thermally insulated chamber is sealed when the openable portion is in a closed position and accessible when the openable portion is in an open position.

In a preferred embodiment the openable portion is a portion or the whole of one side of the thermally insulated housing. It will be apparent that it is not necessary for the entire side to open—merely that a portion of the side is openable so as to allow access to the enclosed insulated chamber. Advantageously the openable side is a door component which is hingedly attached to one of the other sides. Additionally or alternatively, the openable portion can be a removably engagable lid component.

The thermally insulated housing can be made from any suitable material having thermal insulation properties. Preferably, but not exclusively, the thermally insulated outer housing comprises a material selected from: expanded polypropylene (EPP), polyurethane (PU), Aerogel, and vacuum panels. Suitable thermally insulated outer housings are described in WO 2008/104639 A1, which is hereby incorporated in its entirety.

The thermal insulated container also comprises a product storage assembly mounted within the enclosed insulated chamber. Preferably, the product storage assembly is removably mounted within the enclosed insulated chamber, since this allows it to be cleaned separately from the thermally insulated housing. However, it is also possible for the product storage assembly to be permanently mounted within the outer housing.

The product storage assembly has an inner surface defining an internal product storage chamber. The product storage assembly also has an outer surface, defining its outer perimeter within the enclosed insulated chamber.

The product storage assembly is positioned within the enclosed insulated chamber such that there is a gap between the outer surface of the product storage assembly and the inner surface of the thermally insulated housing. The gap or spacing has a magnitude of 1 to 10 mm. This has been found to provide a good balance between providing additional thermal insulation (provided by the spacing) without compromising the size of the internal product storage chamber.

In order to ensure that the gap is maintained even when the thermally insulated container is subjected to significant vibrations (e.g. such as may be the case if turbulence in an aircraft is encountered), it is preferred that the gap has a width of at least 2 mm, more preferably at least 2.5 mm, and most preferably at least 3 mm. In order to maximise the space available for storing frozen confections within the insulated container, it is preferred that the gap has a width of no more than 8 mm, preferably no more than 6 mm, and most preferably no more than 5 mm.

Although maintenance of the spacing or gap is an essential element of the present invention, there will need to be some support structures positioning the product storage assembly within the thermally insulated housing. Therefore, the outer surface of the product storage assembly is spaced away from at least 90% of the surface area of the inner surface of the thermally insulated housing, preferably at least 95%.

There are several ways to ensure that the product storage assembly is appropriately spaced away from the inner surface of the thermally insulated housing. The inner surface of the thermally insulated housing can have moulded protrusions (e.g. one at each corner) which hold the product storage assembly in place so as to maintain the necessary spacing. Since such protrusions are only in contact with the outer surface of the product storage assembly over a very limited surface area, and since they are made of the same insulating material as the thermally insulated outer housing, there is little thermal energy transfer between the product storage assembly and the outer housing. Alternatively, the product storage assembly can have pins which interact with moulded grooves in the outer housing, thus enabling the product storage assembly to "hang" within the insulated chamber. A further option is for the product storage assembly to be supported by an insulated stand having legs which are embedded in the outer housing such that these legs are the only contact points between the product storage assembly and the outer housing, with the product storage assembly and the stand being in tight contact, such that the product storage assembly is held firmly by the stand, ensuring that the product storage assembly does not move about and thus that the outer surface of the product storage assembly remains spaced from the inner surface of the thermally insulated housing.

The internal product storage chamber is accessible via the openable portion of the thermally insulated housing. This may be provided by an opening, i.e. an absence of any inner or outer surface, adjacent to the openable portion in the thermally insulated housing.

The product storage assembly preferably has at least an upper wall and a lower wall which are connected by two side walls, thereby delineating a four-sided thermally perimeter within the outer housing, leaving two faces open for access to the internal product storage chamber. In this embodiment, one of the open faces would align with the openable portion in the thermally insulated housing.

Although for convenience the walls are described with reference to their position in a preferred arrangement, the skilled person will appreciate that the thermally insulated container of the present invention is designed to be transportable and may be rotated during use. Therefore, the designation "upper wall", "lower wall" and "sidewall" should not be read as limiting the orientation of the frame per se.

It is possible (but not necessary) that the product storage assembly additionally comprises a back plate. Where such a back plate is present the product storage chamber delimits a five-sided boundary within the outer housing, with a single open face. In this case the open face will be aligned with the openable portion in the thermally insulated housing.

The product storage assembly could additionally comprise a front plate. Where both a back plate and a front plate are present, the product storage assembly delimits a six-sided boundary within the outer housing. Where such an arrangement is present, at least one side of the product storage assembly is openable—preferably the front plate and/or the back plate, and most conveniently the front plate. Whichever plate is openable will be aligned with the openable portion in the thermally insulated housing, to provide access to the internal product storage chamber.

In order to maximise the volume available for accommodating the scoopable frozen confectionery, it is preferred that the thickness (that being the distance from the inner surface to the outer surface) of the product storage assembly is not too great. Therefore, the product storage assembly preferably has a thickness of no more than 5 mm, more preferably no more than 4 mm, or even no more than 3 mm.

In order to preserve the spacing (or gap) between the product storage assembly and the thermally insulated housing discussed above, a relatively rigid product storage assembly is preferred (especially in arrangements with a small gap). Therefore, the product storage assembly preferably has a thickness of at least 0.5 mm, more preferably at least 0.8 mm, still more preferably at least 1 mm or even at least 1.5 mm.

Whilst it is envisaged that the upper wall, lower wall and side walls can be continuous sheets of material, this is not necessary. Indeed, one or more of these walls could have a partially discontinuous structure (e.g. a mesh-like or lattice-like structure). For example, one or more of the walls could comprise a perforated metal sheet or a wire mesh. The same is true of the front and/or back plate (where present). Such a partially discontinuous structure may be advantageous as it has the potential to reduce the overall weight of the product storage chamber. Where one or more wall has a partially discontinuous structure, it is preferred that there is an additional barrier layer to help maintain the gap between the product storage assembly and the thermally insulated housing. For example, such a barrier layer could be provided by a reservoir of phase change material, product drawer and/or any secondary packaging.

The product storage assembly comprises at least one scoopable frozen confectionery container support positioned in the internal product storage chamber.

For example, the scoopable frozen confectionery container support may be a simple shelf. In a preferred embodiment the scoopable frozen confectionery container support is a drawer, which could be considered to be a shelf but with upstanding side walls. In both cases it is preferably that the scoopable frozen confectionery container support is removable from the product storage assembly, e.g. in a slidable manner, via the openable portion in the thermally insulated housing. A product storage assembly may comprise one, two, three, or more such shelves or drawers, as desired. The drawer or shelf may be provided by a standard restaurant or catering pack such as stainless steel or plastic containers. Additionally the shelf or drawer may be comprised of standard ice pack packaging.

In one embodiment, the product storage assembly may also comprise a supply of frozen confectionery items. These may be provided in at least one frozen confectionery item support positioned in the internal product storage chamber. For example, an upper drawer (or shelf) could comprise scoopable frozen confectionery and a lower drawer (or shelf) could comprise frozen confectionery items. Non-limiting examples of frozen confectionery items include ice cream, gelato, frozen yoghurt, sorbet, granita, water ice, and the like.

In order to maintain the temperature-controlled environment in the internal product storage chamber at least a first reservoir of phase change material is provided. Preferably it is positioned in thermal contact with the product storage assembly. The first reservoir of phase change material is preferably positioned so as to contact the upper wall of the product storage assembly, and is most preferably positioned in the gap between the outer surface of the product storage assembly and the inner surface of the outer housing. Nevertheless, it is also possible for the first reservoir of phase change material to be positioned so as to contact the lower wall of the product storage assembly and/or a sidewall of the product storage assembly.

In a preferred embodiment the inner surface of the internal product storage chamber comprises an inner thermally conductive sheet, and the outer surface of the internal product storage chamber comprises an outer thermally conductive sheet, the inner and outer thermally conductive sheets enclosing between them an enclosed space comprising a reservoir of phase change material.

Additionally or alternatively, preferably the inner surface of the at least one frozen confectionery item support comprise an inner thermally conductive sheet, and the outer surface of the at least one frozen confectionery item support comprises an outer thermally conductive sheet, the inner and outer thermally conductive sheets enclosing between them an enclosed space comprising a reservoir of phase change material.

In both cases preferably the inner and outer thermally conductive sheets are bonded metal sheets, produced in a roll bond method of manufacture. The sheets would not be planar but instead comprise depressions within the sheet, which align with a depression in the bonded sheet to provide a contained cavity, within which the phase change material is provided.

The thermally insulated container preferably comprises a second reservoir of phase change material positioned in the enclosed insulated chamber. In a preferred arrangement, the first reservoir of phase change material is positioned so as to contact the upper wall of the product storage assembly and the second reservoir of phase change material is positioned so as to contact the lower wall of the product storage assembly. In such an arrangement, the first reservoir is preferably positioned in the gap between the outer surface of the product storage assembly and the inner surface of the outer housing, and the second reservoir of phase change material is positioned within the product storage assembly.

As the phase change material changes from solid to liquid phase, the effect of gravity will mean that the liquid phase contacts the lower surface of the reservoir. Without wishing to be bound by theory, the inventors believe that the thermal contact between the reservoir(s) of phase change material and the product storage assembly is more efficient if the reservoir is arranged on top of the appropriate surface of the product storage assembly. Thus, where the reservoir is positioned so as to contact the upper wall of the product storage assembly, then the reservoir is preferably positioned outside the product storage assembly (i.e. on top of and in contact with the upper external surface of the product storage assembly). Conversely, where the reservoir is positioned so as to contact the lower wall of the product storage assembly, then the reservoir is preferably positioned inside the product storage assembly (i.e. on top of and in contact with the lower internal surface of the product storage assembly). Where a reservoir of phase change material is positioned so as to contact a side wall of the product storage assembly, there is no preference between it being positioned inside or outside the assembly in respect of gravity effects. Rather, the choice of position will be determined based on where sufficient space is most readily available to accommodate the reservoir of phase change material.

The precise construction of the reservoir of phase change material is not especially important. For example, the phase change material could be contained within a flexible outer membrane or within a rigid shell.

A rigid shell filled with phase change material is sometimes preferred, as such a shell can have one or more feature(s) which interact with one or more feature(s) of the thermally insulated housing (e.g. protruding side ribs which interact with moulded grooves in the internal surface of the outer housing). This arrangement allows the product storage assembly to be mounted within the enclosed insulated chamber, e.g. by attaching the product storage assembly to the surface of the phase change reservoir so that it "hangs" from the reservoir (thus maintaining the gap). In such an arrangement, the feature(s) of the reservoir which interact with the feature(s) of the thermally insulated housing are typically made from a thermally insulating material in order to further minimise heat transfer. A further benefit of using a rigid shell filled with phase change material is that such a shell is typically refillable.

Nevertheless, a flexible outer membrane filled with phase change material is sometimes appropriate. For example, where minimising the space taken up by the reservoir(s) is more important than structural rigidity. Of course, it is also possible to use a mixture of types of reservoirs (e.g. rigid shells in contact with the top of the inner frame, and flexible membranes in contact with the side(s) of the inner frame).

The various methods of locating the phase change material within the walls will be known to the person skilled in the art.

The skilled person will be able to select an appropriate phase change material. The melting temperature of the phase change material is preferably −30° C. to −6° C., −27° C. to −12° C., −25° C. to −15° C., or even −22° C. to −18° C. Eutectic material is a preferred example of a suitable phase change material. Melting temperatures at the lower ends of these ranges are preferred where longer storage periods are anticipated (e.g. if the frozen confectionery items are to be served on a long-haul flight), whereas for shorter storage periods a melting temperature at the upper end of these ranges may be more appropriate (i.e. to ensure that the frozen confectionery items are served at a temperature where they can be consumed straight away on removal from the thermally insulated container).

In order to provide sufficient cooling without compromising the amount of storage space, it has been found to be preferable that the ratio of the amount of phase change material (kg) to the volume of enclosed insulated chamber (litre) is in the range of from 1:25 to 1:5.

The thermally insulated storage container of the present invention permits scoopable frozen confectionery to be stored and served without the need for using dry ice as a coolant. Nevertheless, if it is important to store the scoopable confectionery for a prolonged period prior to serving it (e.g. if the scoopable frozen confectionery is to be served on a long-haul flight), then it is preferred that the container comprises dry ice in addition to the reservoir(s) of phase change material.

The thermally insulated container of the present invention is relatively compact, and therefore has particular application where storage space is limited. For example, the container can be used with inflight service carts, which have dimensional challenges due to their need to be stowed during take/off and manoeuvred through the narrow aircraft aisles. The arrangement allows frozen confectionery items to be kept remote from a storage freezer for a significant period of time (typically up to 24 hours), and facilitates serving during this storage time. As such, the invention relates to an inflight service cart comprising at least one thermally insulated container according to the first aspect of the invention.

Due to the fact that the thermally insulated container is intended to be mobile and deployed within a service cart, the thermally insulated container is unpowered. This means that the container does not comprise any refrigeration cycle apparatus components (such as a pump and compressor) and is not connectable to an exterior power supply.

The thermally insulated container of the present invention is preferably arranged to be removably mounted within a service cart, preferably an inflight service cart.

Thus, in a second aspect, the invention relates to a service cart comprising a thermally insulated container as described herein.

Inflight service carts have been used for decades on commercial flights. They conventionally take the form of a rigid box, with casters at each corner of the base that can be locked to hold the cart in position. Both full and half size carts are available, which differ in their length: approximately 80 cm for a full size cart and 40 cm for a half size cart. Both full and half size carts are approximately 30 cm wide and around 1 m tall. Doors are typically provided at both the front and back of the cart in the case of full size carts, and just at the front for half size carts. The skilled person would be able to provide an insulated box which could be removably mounted within a conventional inflight service cart. Especially as there are only 3 major configurations of airline service carts available: ACE, ATLAS and KSSU, with each of these configurations being internationally recognised within the airline industry.

In a third aspect the relates to a method for storing and serving frozen scoopable confectionery using the thermally insulated container of the first aspect of the invention.

The method comprises the step of cooling the reservoir(s) of phase change material to a temperature of less than $-6°$ C. For example, the product storage assembly can be cooled to the appropriate temperature with the reservoir(s) of phase change material in situ. Preferably, the reservoir(s) of phase change material are stored for a period of at least 2 hours in a freezer operating below a temperature of $-6°$ C. Preferably, the freezer operates at a temperature below $-12°$ C., more preferably below $-15°$ C. or even below $-18°$ C. The lower limit of the freezer temperature is not especially important, and will largely depend on the operating parameters of the available freezer(s). Whilst there are commercially available freezers which operate at very low temperatures (e.g. below $-70°$ C., such as at $-80°$ C. or even $-86°$ C.), these are mainly found in laboratories and it is more common for freezers to operate down to a temperature of $-30°$ C. A cold store room operating at an appropriate temperature could be used in place of a freezer.

Next, the product storage assembly and the reservoir(s) of phase change material are mounted within the enclosed insulated chamber of the thermally insulated housing. The product storage assembly is positioned within the enclosed insulated chamber such that there is a gap between the outer surface of the product storage assembly and the inner surface of the thermally insulated housing, the gap having a width of 1 to 10 mm.

Scoopable frozen confectionery is loaded within the product storage assembly, which may be before or after the freezing step discussed above.

The scoopable frozen confectionery is stored within the internal product storage chamber for a period of up to 24 hours. This time period relates to the storage of the scoopable frozen confectionery remote from a freezer. The scoopable frozen confectionery is served during this storage period by opening the openable portion of the thermally insulated housing and removing at least one scoop of frozen confectionery from the internal product storage chamber, and then preferably closing the openable portion of the thermally insulated housing.

Preferably the scoopable frozen confectionery is loaded into the product storage assembly by placing the scoopable frozen confectionery into a drawer and engaging the drawer within the product storage assembly such that the drawer can be moved relative to the product storage assembly in a slidable manner between an open position and a closed position. The scoopable frozen confectionery can then be served by opening the openable portion of the thermally insulated housing, sliding the drawer to the open position and serving a scoop of the scoopable frozen confectionery, and then preferably sliding the drawer to the closed position and closing the openable portion of the thermally insulated housing. It will be appreciated that a plurality of drawers can be used (as already discussed above).

The various features of the present invention referred to in individual sections above apply, as appropriate, to other sections mutatis mutandis. Consequently, features specified in one section may be combined with features specified in other sections as appropriate.

As used herein the term "comprising" encompasses the terms "consisting essentially of" and "consisting of". Where the term "comprising" is used, the listed steps or options need not be exhaustive. As used herein, the indefinite article "a" or "an" and its corresponding definite article "the" means at least one, or one or more, unless specified otherwise. Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about".

The invention will now be illustrated, by way of example, and with reference to the following figures, in which.

Figure 1:
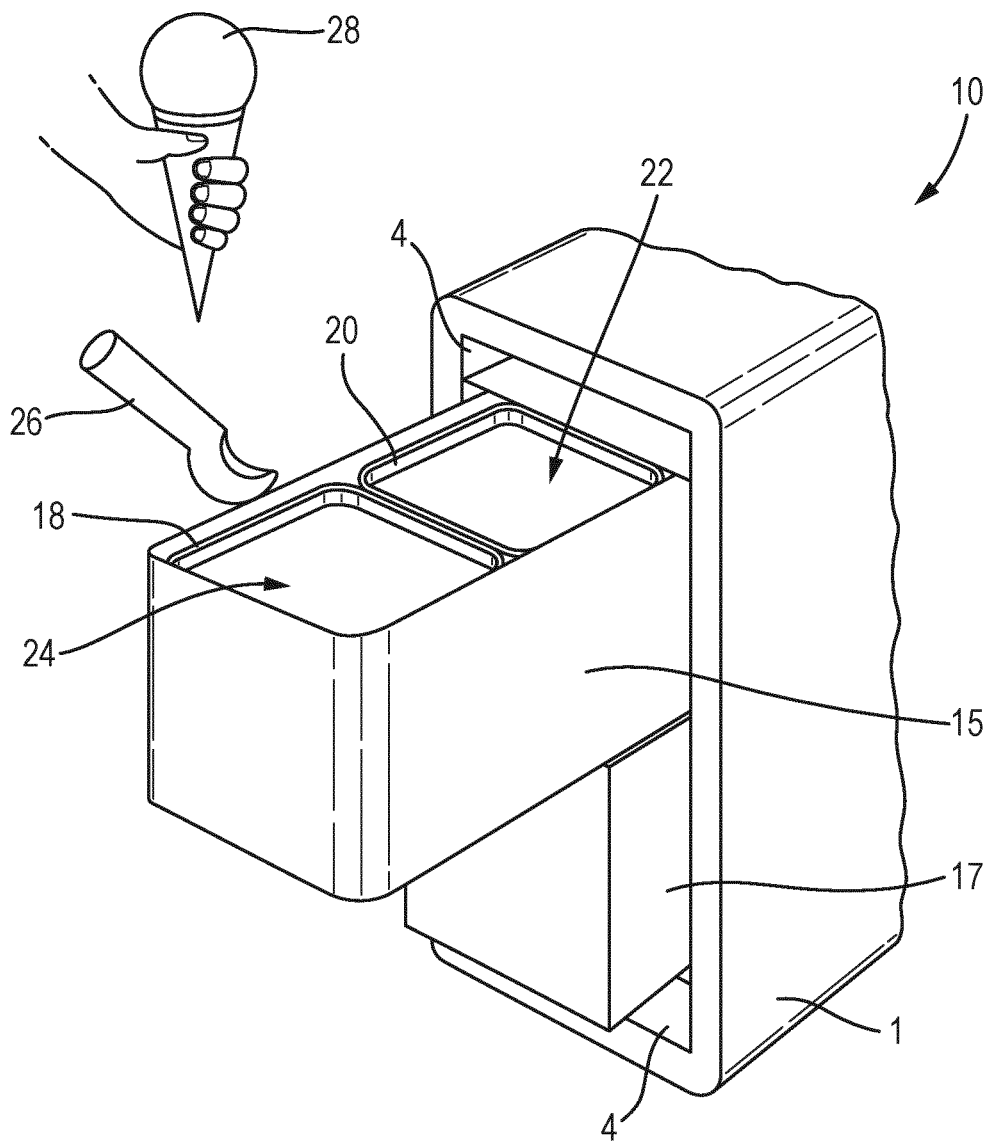
FIG. 1 is a perspective schematic representation of a thermally insulated container according to the present invention.

Turning to the figures, FIG. 1 shows a thermally insulated container 10 comprising a thermally insulated housing 1 providing a cuboid exterior wherein the front wall is hingedly openable (not shown) which provides the openable portion and defining an enclosed insulated chamber. The thermally insulated housing 1 comprises a product storage assembly 4 mounted within the enclosed insulated chamber, the internal surface of which defining an internal product storage chamber and comprising two drawers 15, 17 acting as scoopable frozen confectionery container supports. A gap is maintained between the outer surface of the product storage assembly 4 and the interior surface of the thermally insulated housing 1. Drawer 15 comprises two scoopable frozen confectionery containers 18, 20 shown without a lid present.

However in general, the scoopable frozen confectionery containers 18, 20 would comprises a lid for storage. Drawer 17 comprises two similar scoopable frozen confectionery containers, but these are not shown. Each container 18, 20 comprises scoopable frozen confectionery 22, 24.

In use, the hinged front wall (not shown) of the thermally insulated housing 1 is opened and drawer 15 is withdrawn from the internal product storage chamber. The lid (not shown) of one of the frozen confectionery containers 18 is removed to expose the contained frozen confectionery 22. A scoop 26 is inserted into the frozen confectionery 22 to obtain a scoop of frozen confectionery which is then used to prepare a frozen confectionery item 28 to be dispensed to a consumer. Thereafter, the lid (not shown) is placed onto frozen confectionery container 18 and the drawer 15 is replaced within the internal product storage chamber, whereafter the hinged door (not shown) is closed to seal the thermally insulated housing 1.

Figure 2A:
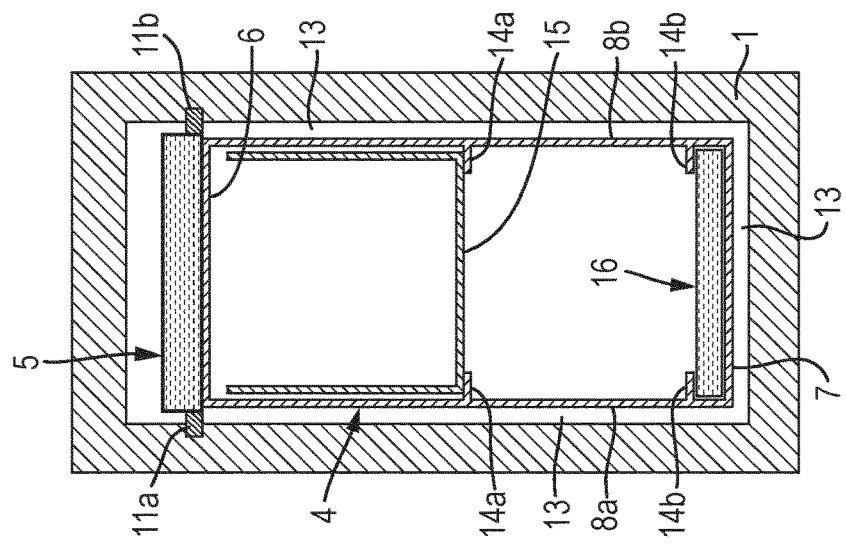
FIGS. 2a, 2b and 2c are front sectional views through thermally insulated containers according to the invention.
Figure 2B:
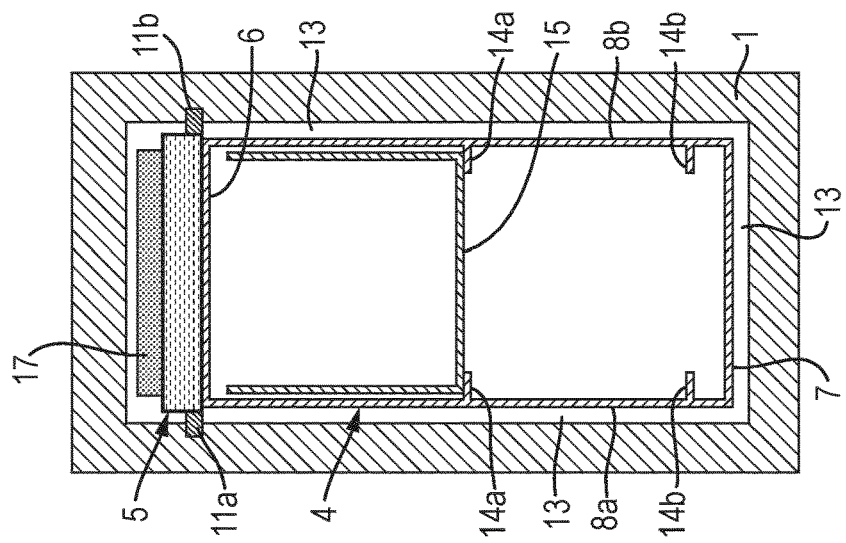
Figure 2C:
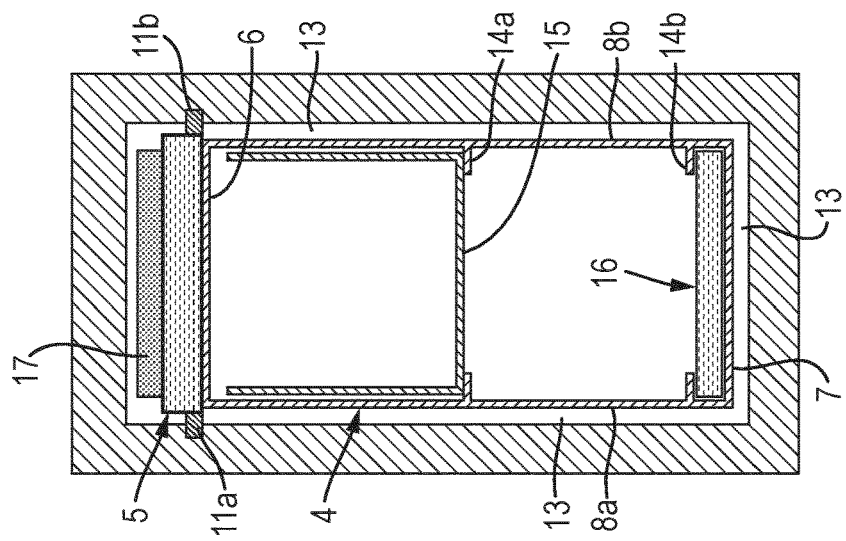

FIGS. 2a, 2b and 2c show cross-sectional views of further thermally insulated containers. In each case, the thermally insulated outer housing 1 is made of EPP, and has a hinged front panel (not shown) to allow access to the enclosed insulated chamber 2. The product storage assembly 4 is made from aluminium and has a thickness of 1.5 mm. The product storage assembly 4 has an upper wall 6 and a lower wall 7 which are connected by two side walls 8a, 8b, thereby delineating a four-sided thermally conductive perimeter. In addition, each side wall 8a, 8b has a projection 14a. These projections 14a support product drawer 15 (which provide the scoopable frozen confectionery container support), thereby enabling the drawer 15 to slide between a closed position (where it is enclosed within the product storage assembly) and an open position. Of course, the projections 14a could equally support a shelf (not shown). The product drawer 15 is made of aluminium and can hold a frozen confectionery container. Only a single product drawer 15 is shown in each of FIGS. 2a, 2b and 2c. Nevertheless, it will be appreciated that an additional product drawer could be positioned in the lower part of the inner frame, i.e. supported by projections 14b.

A first reservoir of phase change material 5 is located on top and in contact with the outer surface of the product storage assembly 4. The first reservoir of phase change material 5 is provided in a rigid shell and has two protruding side ribs 11a, 11b, which interact with moulded grooves of the outer housing, thus enabling the product storage chamber 4 to "hang" within the insulated chamber such that there is an air gap (or spacing) 13 between the thermally insulated outer housing 1 and product storage chamber 4 of 2 to 3 mm around all sides of the product storage chamber 4.

The thermally insulated containers of FIGS. 2a and 2c both include a second reservoir of phase change material 16, which is positioned in the lower part of the product storage chamber—specifically so as to contact the lower wall 7 of the product storage chamber 4. As such, it will be apparent that the second reservoir of phase change material 16 is in thermal contact with the product storage assembly 4. Should an additional product drawer be provided in either of these containers, it would be positioned in the lower part of the product storage assembly, i.e. supported by projections 14b. Of course, projections 14b are not essential, and it will be apparent that these projections could be omitted from the arrangements. For example, if these projections 14b were omitted from the arrangement of FIG. 2b, then there would be additional space for the product drawer 15 since it would now sit on the lower wall 7 of the product storage assembly 4.

The thermally insulated containers of FIGS. 2b and 2c both include dry ice 17, which is positioned on top of the first reservoir of phase change material 5.

The invention claimed is:

1. A thermally insulated container for storing a scoopable frozen confectionery and serving a scoop thereof to a consumer, and suitable for mounting within a service cart, the thermally insulated container being unpowered and comprising:

a thermally insulated housing having an inner surface, defining an enclosed insulated chamber, and an outer surface for mounting engagement with the service cart, the thermally insulated housing having at least one openable portion to allow access to the enclosed insulated chamber through both the inner and outer surfaces;

a product storage assembly comprising a lower wall, mounted within the enclosed insulated chamber, having an outer surface and an inner surface, the inner surface defining an internal product storage chamber, the internal product storage chamber being accessible via the openable portion of the thermally insulated housing, and the outer surface being substantially parallel to but spaced away from at least 90% of the surface area of the inner surface of the thermally insulated housing, the average spacing being from 1 to 10 mm;

at least one reservoir of phase change material located in the enclosed insulated chamber;

at least one scoopable frozen confectionery container support which comprises a shelf positioned in the internal product storage chamber, the frozen confectionery container support being withdrawable from the internal product storage chamber via the openable portion of the thermally insulated housing;

and wherein at least one frozen confectionery container is provided, supported on the at least one frozen confectionery container support, the frozen confectionery container comprising a removable lid, and containing a source of scoopable frozen confectionery;

the arrangement being such that in use, the openable portion can be opened to permit the withdrawal of the frozen confectionery container support and the frozen confectionery container from the internal product storage chamber, the lid of the frozen confectionery container being removable to expose the scoopable frozen confectionery, for enabling a scooped serving of the frozen confectionery to be removed from the source of scoopable frozen confectionery and serving to a consumer.

2. The thermally insulated container according to claim 1, wherein the spacing between the outer surface of the product storage assembly and the inner surface of the thermally insulated housing is from 2 to 8 mm.

3. The thermally insulated container according to claim 1, wherein the at least one frozen confectionery item support is at least one drawer that is withdrawable from the product storage assembly via the openable portion of the thermally insulated housing.

4. The thermally insulated container according to claim 1, wherein the outer surface of the product storage assembly is spaced away from at least 95% of the surface area of the inner surface of the thermally insulated housing.

5. The thermally insulated container according to claim 1 additionally comprising a second reservoir of phase change material in the enclosed insulated chamber.

6. The thermally insulated container according to claim 1, wherein the phase change material has a melting point of from −30° C. to −6° C.

7. The thermally insulated container according to claim 1, wherein the ratio of the amount of phase change material (kg) to the volume of enclosed insulated chamber (litre) is in the range of from 1:25 to 1:5.

8. A service cart comprising a thermally insulated container according to claim 1.

9. The service cart according to claim 8, wherein the service cart is an in-flight service cart.

10. A method for storing and serving scoopable frozen confectionery using a thermally insulated container as claimed in claim 1, the method comprising:
   cooling the at least one reservoir of phase change material to a temperature of less than −6° C.;
   mounting the product storage assembly and the at least one reservoir of phase change material within the enclosed insulated chamber of the thermally insulated housing, wherein scoopable frozen confectionery is loaded within the product storage assembly; and
   wherein the product storage assembly is mounted within the enclosed insulated chamber such that the outer surface of the product storage assembly is substantially parallel to but spaced away from substantially all of the inner surface of the thermally insulated housing, the average spacing being from 1 to 10 mm
   storing the scoopable frozen confectionery within the enclosed insulated chamber for a period of up to 24 hours and serving the scoopable frozen confectionery during the storage period by opening an openable portion of the thermally insulated housing and removing at serving at least one scoop of scoopable frozen confectionery from the enclosed insulated chamber.

11. The method for storing and serving frozen confectionery items as claimed in claim 10, wherein:
   the scoopable frozen confectionery is loaded into the product storage assembly by placing the scoopable frozen confectionery into a scoopable frozen confectionery support; and
   the scoopable frozen confectionery is served by opening the openable portion of the thermally insulated housing, removing at least one of the scoopable frozen confectionery container supports, and subsequently closing the openable portion of the thermally insulated housing.

12. The method for storing and serving frozen confectionery items as claimed in claim 11, wherein: the scoopable frozen confectionery container support is a drawer and the method involves engaging the product drawer within the product storage assembly such that the drawer can be moved relative to the product storage assembly in a slideable manner between an open position and a closed position; and sliding the product drawer to the open position and then, following removal of a scoop of scoopable frozen confectionery, sliding the product drawer to the closed position.

13. The thermally insulated container according to claim 2, wherein the spacing between the outer surface of the product storage assembly and the inner surface of the thermally insulated housing is from 3 to 5 mm.

14. The method for storing and serving scoopable frozen confectionery using a thermally insulated container as claimed in claim 10, the method further comprising closing the openable portion of the thermally insulated housing.

15. The thermally insulated container according to claim 1 wherein the shelf comprises a drawer.

* * * * *